Patented Oct. 11, 1932

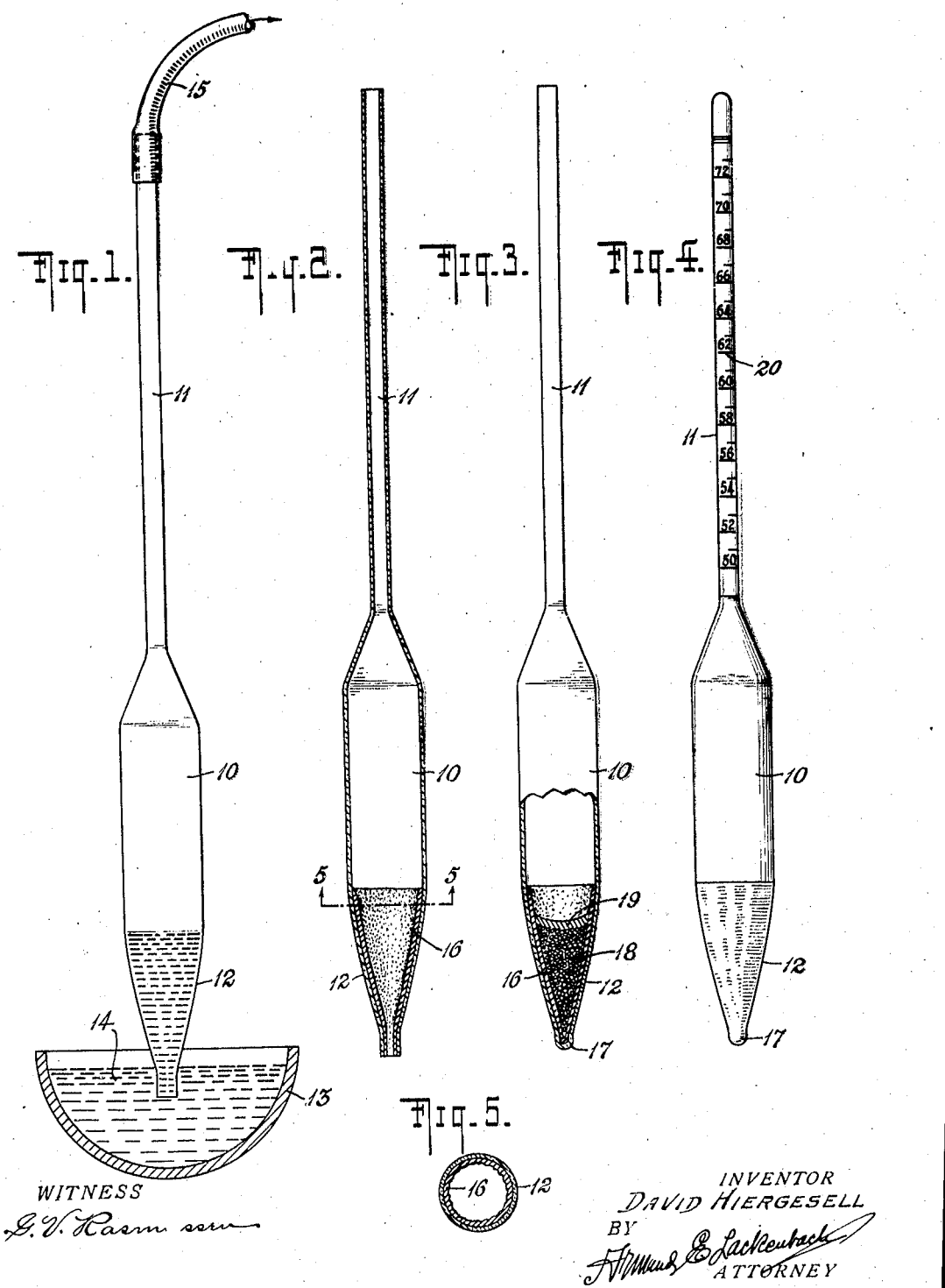

1,882,321

UNITED STATES PATENT OFFICE

DAVID HIERGESELL, OF RICHMOND HILL, NEW YORK, ASSIGNOR TO VALENTINE HIERGESELL AND DAVID HIERGESELL, COPARTNERS, DOING BUSINESS AS WM. HIERGESELL & SONS, OF NEW YORK, N. Y.

HYDROMETER

Application filed May 1, 1931. Serial No. 534,254.

My invention relates to hydrometers and particularly to that type of hydrometer which is made of glass and consists of a graduated stem above a hollow bulb in which a ballast material is placed to make the instrument float upright when placed in a liquid, the density or specific gravity of which is sought to be determined by noting the depth to which the hydrometer sinks in such liquid. The object of my invention is to provide a new form of hydrometer which possesses certain advantages over the various types of hydrometers of the prior art. A more particular object of my invention is to provide a hydrometer which is so constructed that its ballast portion is lined with metal congealed in situ from a suction-introduced and subsequently released molten mass metal, leaving a metal-lined pocket for the reception of weighted bodies and sealing wax or the like, so that the sealing wax adheres not to the glass (as usual) but to the metal lining of the hydrometer bulb. By these means, the permanency of the position of all weighting portions in the instrument is greatly improved. Furthermore by these means the body of glass is rendered non-shatterable if broken and greatly strengthened and the hydrometer will resist loosening of the weighted parts notwithstanding repeated expansion and contraction of the glass or the weighted parts, in the course of its utilization in testing liquids of greatly varying temperatures.

A specific embodiment of my invention is illustrated in the accompanying drawing in which my improved hydrometer is shown at various stages of the process of making the same. In said drawing, Fig. 1 illustrates a hydrometer at the first stage of its process of manufacture after the glass tubing forming the body of the hydrometer has been prepared by the glass blower and in which figure is shown the means used in introducing into the hydrometer chamber the metallic composition forming a coating for the bottom portion of the chamber as more fully described hereinafter. Fig. 2 is a vertical section of the hydrometer after the completion of the first step of its manufacture. Fig. 3 is a front view, partly in section, of my improved hydrometer at the completion of the second stage of its manufacture. Fig. 4 is a front view of a completed hydrometer in accordance with my invention. Fig. 5 is a section along line 5—5 of Fig. 2.

Referring more particularly to the drawing, in which similar reference characters identify similar parts in the several views, 10 is the hydrometer ballast chamber having the tubing 11 extending upwardly therefrom and terminating in the tapered bottom portion 12, comprising the hydrometer body portion prepared of glass by the glass blower in the usual manner. The tapered bottom portion 12 of the chamber 10 is open at its lower tip, and when the glass blower has shaped the structure he immerses such tip in a vessel 13 containing a solution 14 of block tin and a small percentage of zinc. I have found that a molten solution of about one pound of block tin containing about one ounce of zinc yields a very satisfactory result in the practice of my invention.

At the upper end of the stem 11, is attached a rubber tubing 15. After the bottom tip of the hydrometer chamber 10 has been immersed in the molten metal, sufficient suction is applied to the rubber tubing 15 to suck a quantity of the molten metal 14 up into the chamber 10 to an extent approximating the upper extremity of the tapered portion 12. After such an amount of the molten metal has been drawn into the interior of the chamber 10, suction is discontinued, the hydrometer is raised and the molten metal permitted to run out from the chamber 10. A certain amount of the molten metal 14 remains deposited on the inner surface of the lower or tapered portion of the instrument. The amount of tapering of the portion 12 should be just sufficient to permit the metal to cling to the inner surface thereof and I have found that this result can best be obtained if I make the ballast chamber 10 torpedo shaped so that the portion 12 thereof is of gradually tapering cross-section. Under these circumstances such an amount of the molten metal will cling to the inner surface of the chamber as will give such chamber a thin lining of metal illustrated at 16 in Figs. 2 and 3.

The metal deposited on the inner surface of the tapered portion 12 of the hydrometer chamber has an irregular inner surface (see Fig. 5). The deposition of such metal on the glass, however, effects a silvering of such glass, the finish of the metal when viewed from the outside through the glass body of the hydrometer appearing as a highly reflective silvered surface much like a mirror.

Upon completion of this step of depositing an amount of the molten metal on the inner surface of the tapered section 12 of the hydrometer chamber, and after the rubber tubing 15 is removed from the stem 11 the point or tip at the bottom of the tapered portion 12 is cut off and the end sealed by the glass blower, as shown in section at 17 in Fig. 3.

The hydrometer is then filled through stem 11 with a quantity of shot 18 and sealing wax 19, preferably silver colored, which when melted fills the interstices between the shot and holds it rigidly in place, also forming a coating of wax above the body of shot. The hydrometer is then immersed in a standard solution or other suitable standard test liquid and a plurality of readings marked on a loose paper scale 20. The wax having been melted, such paper scale is graduated from said readings, and the scale inserted into the stem. The hydrometer is then re-tested in the standard solution, the paper scale glued into proper position in the stem, and the upper portion of the stem sealed.

The completed hydrometer will then have the appearance as shown in Fig. 4, the bottom or tapered portion of the chamber 10 having a highly reflective mirror finish. It will be noted that in a hydrometer made in accordance with the process just described the metal clinging or adhering to the inner surface of the tapered portion 12 of the glass chamber has a marked strengthening effect on the glass so that the possibility of injury to such glass by its expansion or contraction occasioned by the use of the hydrometer in testing liquids of greatly varying temperature is greatly reduced. It will be further noted that the deposition of the metal on the inner glass surface results in a construction which greatly reinforces such glass and makes it non-shatterable in the event that the hydrometer is broken. If the hydrometer is dropped and the glass broken, the fragments of glass will cling to the metallic lining and will be prevented from dropping into the solution being tested, an advantage which is highly desirable when working with certain solutions or liquids.

A still further feature of my new hydrometer is that I obtain a better bond between the glass and the sealing wax through the medium of the metallic coating than can be obtained when the wax is in direct contact with the glass surface. That is, the metal furnishes a surface to which the wax or other molten ballast will adhere and to which it will be securely joined when it is cast in position.

While I have described a specific embodiment of my invention and specific steps in the process, it is obvious that various modifications therein, particularly in the sequence of steps and in the configuration of the parts, may be made without departing from the invention.

I claim:

1. A hydrometer comprising a closed glass tube, the ballast chamber of which is provided through a portion of its interior surface with a metallic lining adhering thereto to form a surface to which the ballast may be joined.

2. A hydrometer comprising a closed glass tube having a ballast chamber the lower portion of which is tapered, the inner surface of said tapered portion having adhering thereto a thin coating of metallic composition and a ballast cast in place upon said coating.

3. A hydrometer comprising a closed glass tube having a stem and a ballast chamber of substantially torpedo shape, the tapered portion of said chamber remote from said stem being provided with an interior adhering lining of a metallic composition to furnish a surface to which the ballast may be joined.

4. A hydrometer comprising a closed glass tube having a stem, a scale mounted therein, and a ballast chamber the lower portion of which is of tapered configuration, a portion, at least, of the inner surface of said tapered lower portion having deposited thereon a thin coating of a highly reflective metallic composition to furnish a surface to which the ballast may be joined.

Signed at New York city in the county of New York and State of New York this 29th day of April A. D. 1931.

DAVID HIERGESELL.